Patented Dec. 31, 1940

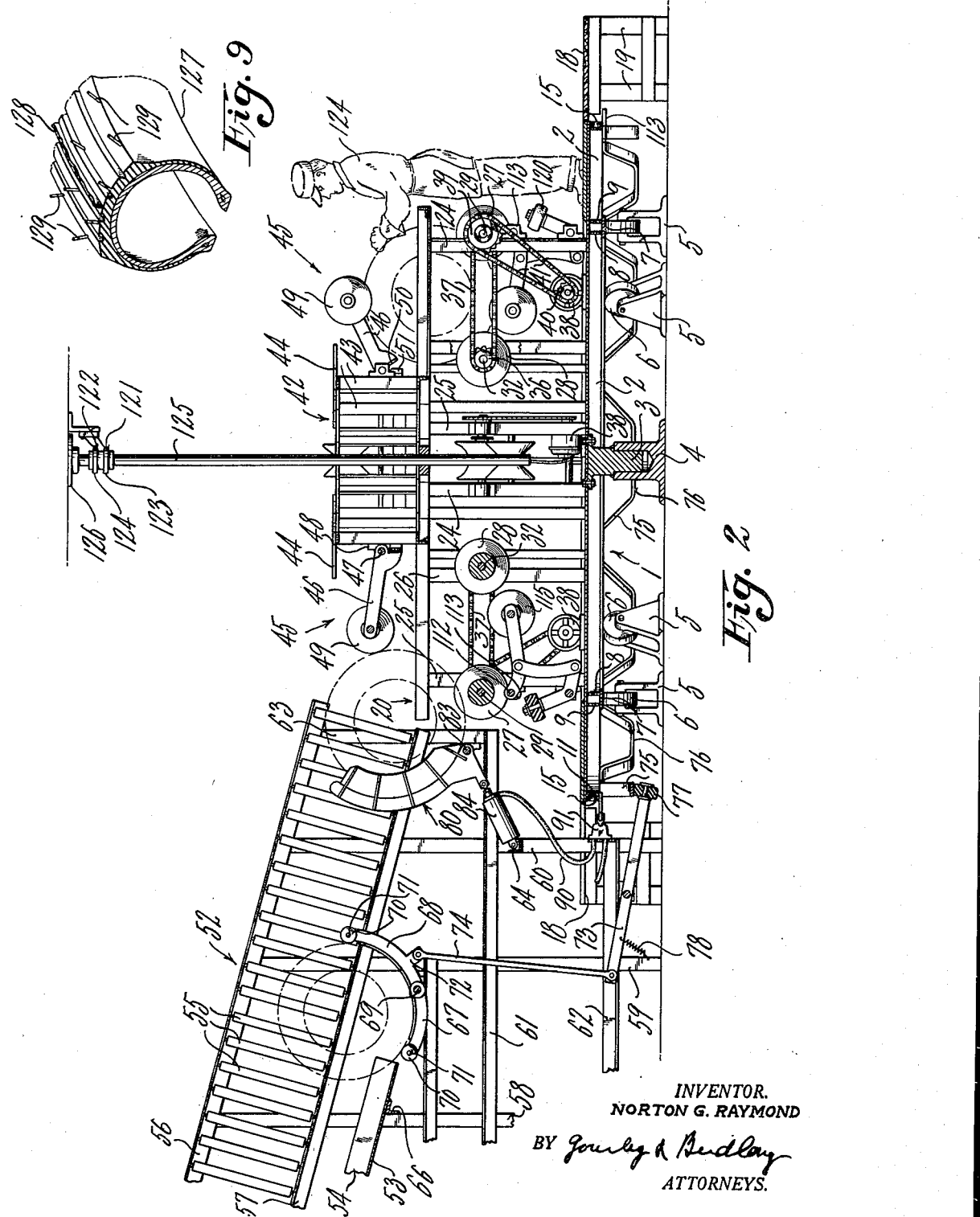

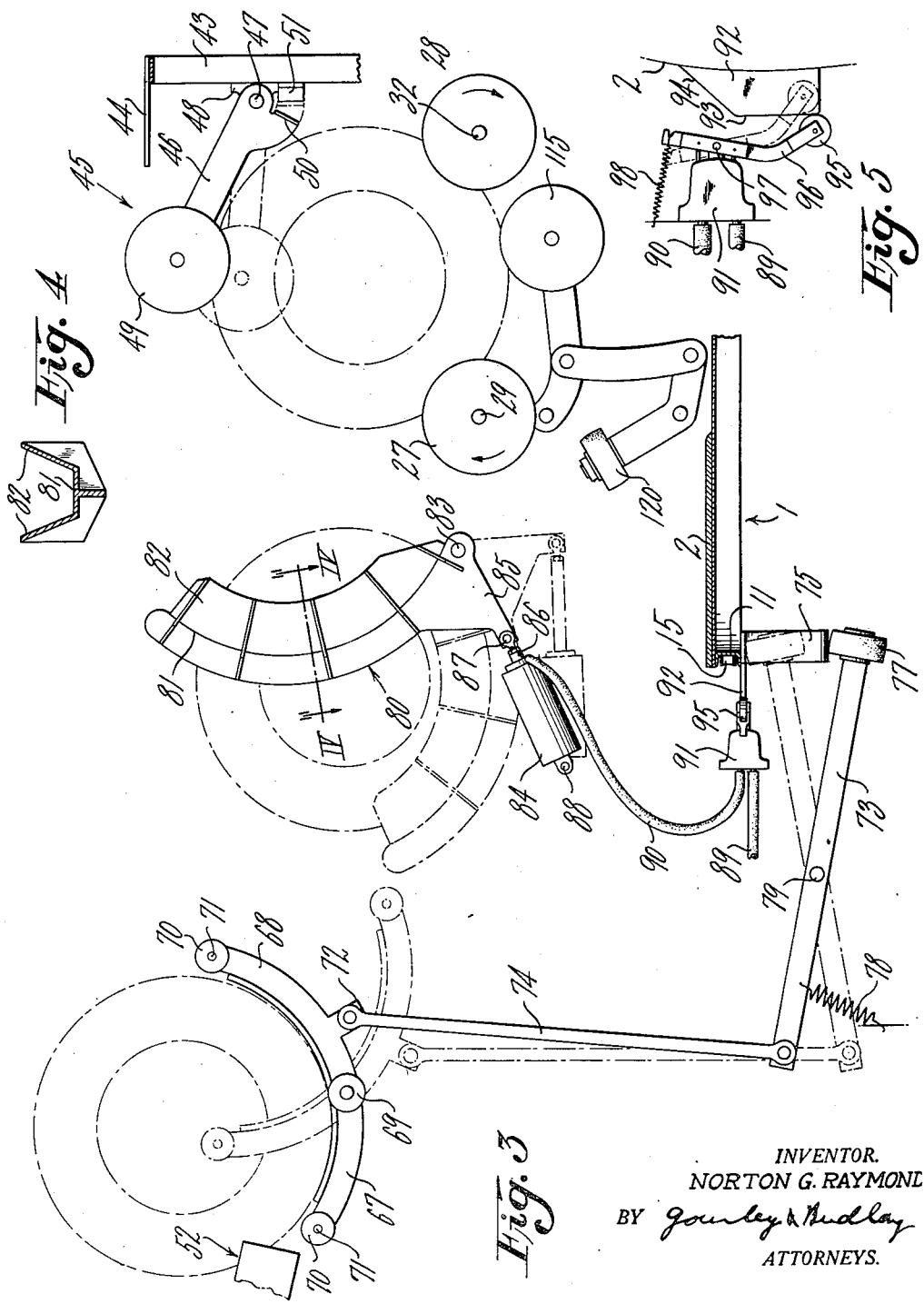

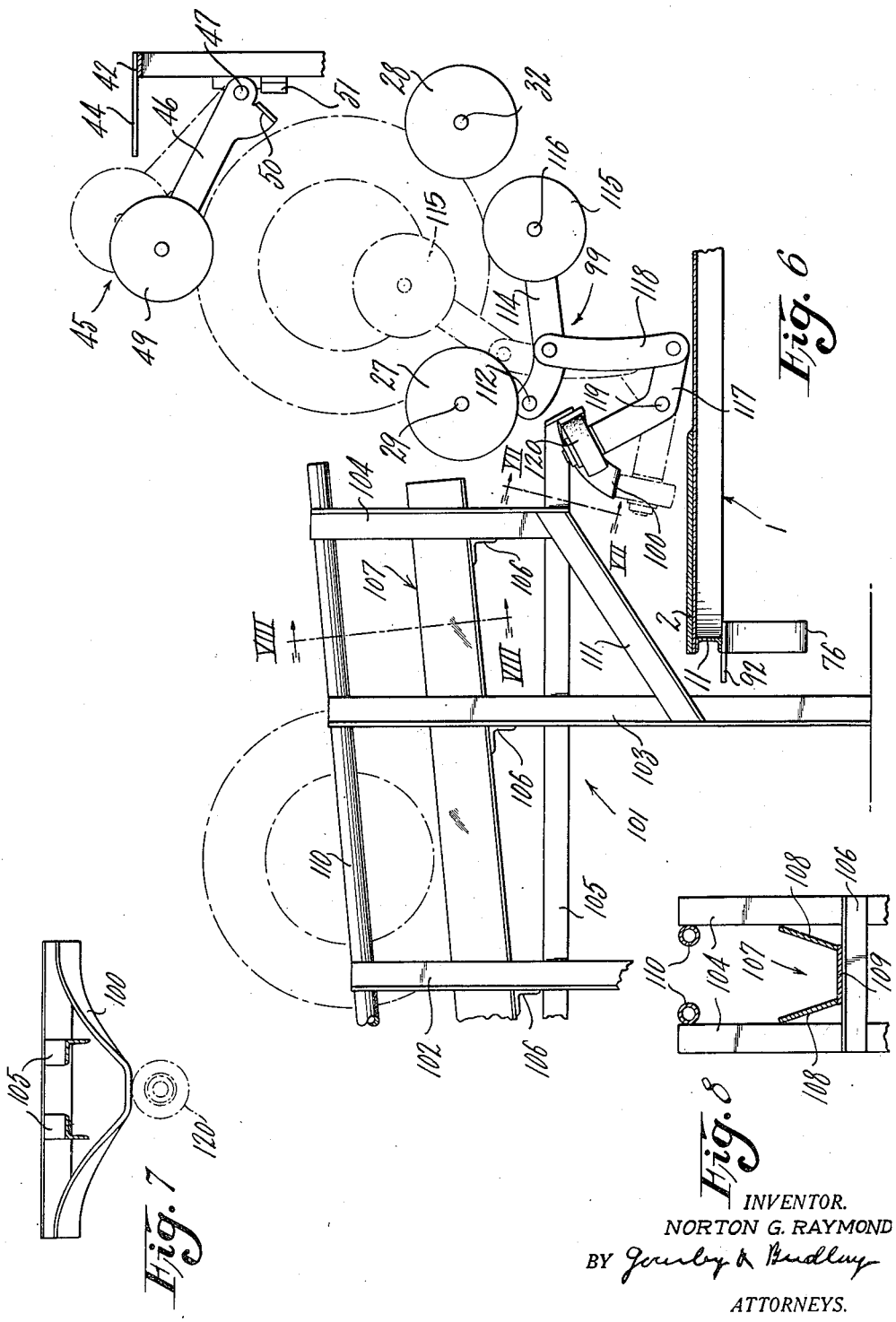

2,226,742

UNITED STATES PATENT OFFICE 2,226,742

APPARATUS FOR TRIMMING TIRES

Norton G. Raymond, Detroit, Mich., assignor, by mesne assignments, to United States Rubber Company, New York, N. Y., a corporation of New Jersey Application September 14, 1937, Serial No. 163,753

11 Claims. (Cl. 154—9)

The invention relates to the manufacture of pneumatic tires, and in particular it relates to a method and apparatus for trimming tires after vulcanization. More particularly, the invention relates to a production conveyor system for manipulating tires during the trimming operation.

In general, the invention comprises an apparatus including a plurality of duplicate mechanical units uniformly disposed about the axis of a rotatable support and adapted to receive pneumatic tires delivered from a conveyor, to maintain the tires in rotative motion as they are conveyer in a predetermined path about the vertical axis of the support while providing opportunity for performing one or more manual operations thereon, and to eject the tires from the mechanism into engagement with a second conveyor system.

In the manufacture and vulcanization of pneumatic tires it is found desirable to provide vent apertures at certain locations of the tire mold to permit escape of gases trapped between the tire surface and the mold. These vents are located principally in the region of the tread. When a tire is vulcanized in a vented mold the rubber flows partly into the vents, with the result that a plurality of projections extend from the tread region of the vulcanized tire. In addition to these projections, other irregularities such as thin ribbon of rubber, generally referred to as "flash," is evidenced on the tire as a result of imperfect engagement of the mold sections. After the tires are vulcanized and removed from molds it is necessary to remove the flash and projections from the tires.

Heretofore the conventional method of manipulating tires for the trimming operation comprised a manual operation. For example, a tire to be trimmed was placed into engagement with a pair of rotatable sheaves, and the operator rotated the tire with one hand and with the other applied a tool for trimming the tire. The tire was manually removed from the machine, and the rate with which the steps in the whole operation were accomplished depended upon the speed and dexterity of the operator. Thus it will be apparent that conventional methods for trimming tires resulted in non-uniformity in rate of production, with a consequent deficiency in the cycle of subsequent operations.

Among the objects of the present invention is to eliminate manual labor as much as possible; to accomplish uniformity in the cycle of movement of the tires to and from the trimming machine; to provide an apparatus for automatically receiving and ejecting tires and for rotating the tires during the trimming operation; and, to provide means for accommodating one or more operators for trimming the tires without stopping the flow of tires through the trimming apparatus.

These and other objects and advantages will be more fully understood by considering the following description in connection with the accompanying drawings, in which:

Fig. 2 is an elevational view, in section, taken along the line II—II of Fig. 1 and illustrating tires moving into engagement with the machine;

Fig. 3 is a diagrammatic view of means for feeding tires to the trimming position of the apparatus;

Fig. 4 is a horizontal view, in section, of a tire support, taken along line IV—IV of Fig. 3;

Fig. 5 is a plan view of a valve and cam mechanism for controlling the tire feeding device;

Fig. 6 is an elevational view of mechanism for discharging tires from the machine;

Fig. 7 is a vertical sectional view of tire discharging cam, taken along line VII—VII of Fig. 6;

Fig. 8 is a vertical view, in section, of a discharging conveyor, taken along line VIII—VIII of Fig. 6; and Fig. 9 is a perspective view of a portion of a tire before it has been trimmed.

Figure 1:
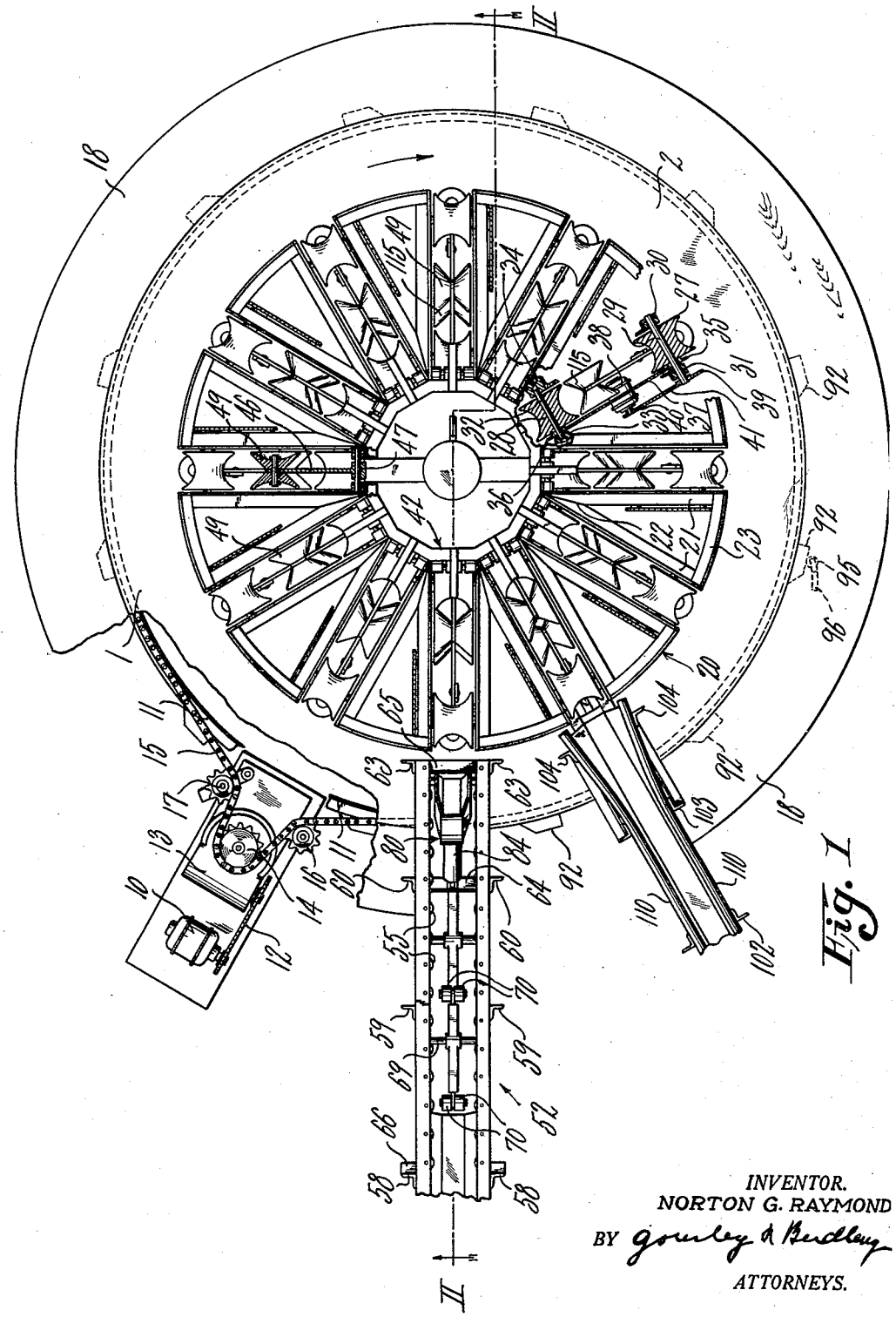
Fig. 1 is a plan view of an apparatus embodying the invention, partly in section.

Referring to the drawings, and in particular to Figs. 1 and 2, the apparatus comprises a rotatable circular frame 1, comprising a table 2 having a downwardly extending hub 3 journaled in a bearing 4. The bearing 4 retains the frame 1 against lateral movement, but does not provide a bearing for downward thrust of the weight of the machine, this weight being supported by a plurality of bearings 5 which carry rollers 6. The rollers 6 engage with a track 7 rigidly connected to the lower side of the table 2, thus being an integral part of the table 2. The track 7 consists of a washer-like member concentrically disposed relative to the hub 3 and retained in spaced parallel relationship with the table 2 by means of a pair of concentrically disposed bands 8 and 9, respectively, secured to the table 2 and track 7.

The table 2 may be rotated about the hub 3 in any convenient manner, as by an electric motor 10 connected to a track or pulley 11 extending from the under side of the table, through a chain 12, conventional speed reduction unit 13, pinion 14, and chain 15. The chain 15 frictionally engages the track 11, and a pair of idler sprockets 16 and 17 permit proper tensioning of the chain.

At substantially the same height as the table 2 is a circular platform 18 resting on supports 19, for providing room for workmen to move past each other while operating the machine.

Mounted on the circular frame 1 is a plurality of sub-frames 20 (Figs. 1 and 2), each of which includes a triangular member comprising horizontal side bars 21 connected at their converging end 22, while their opposite ends are connected to a spacer member 23. The triangular member is supported on the table 2 and spaced therefrom by means of posts 24, 25, and 26, as shown in Fig. 2. It is to be understood that since the several units are duplicates, as are the mechanisms carried thereby, a description of a single unit is applicable to all.

As shown in Fig. 1, twelve sub-frames 20 are disposed about the central axis of the table 2, although any number might be employed within the scope of the invention. The sub-frames 20 are so arranged relative to the axis as to provide a series of stalls between which tire manipulating means may be disposed.

Positioned at a convenient height for an operator is a plurality of spools 27 and 28. The spool 27 is rigidly mounted on a shaft 29, the ends of which are journaled in bearings 30 and 31 secured to the posts 24 and 25, respectively, while the spool 28 is rigidly mounted on a shaft 32 journaled in bearings 33 and 34 supported by the posts 26 of adjacent sub-frames.

In order that the spools may be positively connected for rotation at the same speed, I provide a connection therebetween, comprising sprocket wheel 35 rigidly mounted on the shaft 29 between the bearing 31 and sheave 27, and driving the sprocket 36 rigidly mounted on shaft 32 through chain 37. A motor 38 drives sprocket 39 also rigidly secured to shaft 29 through comparatively small sprocket pinion 40 of the motor 38, and chain 41. Thus, the two spools 27 and 28, being positively connected to each other, are rotated in unison from the same source of power.

The sub-frames 20 are surmounted by a central superstructure 42 (Fig. 2) comprising a plurality of L-shaped members 43 circularly disposed about the vertical axis of the machine and connected at their bases to the tops of the sub-frames in rigid relationship to each other. A series of buffer plates 44 against which the tops of the L-shaped members abut serve as links to connect the individual posts rigidly. The parts are fastened to each other, as by welding.

Mounted on the superstructure 42 is a plurality of guide mechanisms 45 (Fig. 2), each comprising an arm 46 mounted to rotate about a pivot 47 of bearing 48 connected to a vertical member 43 of the superstructure. Near the free end of the arm 46 on either side thereof and in axial alignment are mounted two sections of a sheave 49 which are free to rotate about the shaft 47 but limited in upward travel by the buffer plate 44. A shoulder 50 on the arm 46 is adapted to engage a buffer 51 for limiting the guide 45 in its downward travel. The guide mechanisms 45 are centrally disposed relative to the sides of adjacent sub-frames so that the oscillatory movement of the guide sheaves is through a vertical plane midway therebetween. By this construction and disposition of parts it will be understood that a tire resting on spools 27 and 28, and held in this position by the weight of the guide mechanism, will be so disposed that the axis of the tire will be substantially horizontal, and will rotate with the lower drive sheaves, and that tires within a range of diameters may be effectively accommodated on such a rotatable support.

In the process of tire manufacture it is common practice to convey tires from one point in a factory to another by mechanical or gravity conveyor means, and it is in conjunction with such a device that my invention is intended to be operated. In Figs. 1 and 2 is shown mechanism forming a part of my invention in relation to a factory conveyor system 52 wherein an inclined trough having a base 53 and sides 54 forms a track down which tires roll from some other part of a factory. The tires are held in a substantially horizontal axial plane by a series of rollers 55 supported in bearing rails 56 and 57 at their upper and lower ends, respectively. The rails and trough are fixed and held in position by upright supports 58, 59, and 60, and are braced by the horizontal rails 61 and 62. The rail 61 also aids in supporting an upright member 63 which secures the ends of the bearing rails and affords support for parts later to be described. One side of the conveyor only is illustrated in Fig. 2, but it will be apparent from Fig. 1 that an opposing, duplicate side is fastened to the one first described by means of L-shaped cross-beams, as depicted at 64, 65, and 66 (Figs. 1 and 2).

As a tire rolls down the base of the chute it is halted by a mechanism comprising a yoke including arms 67 and 68 pivoted on a bearing shaft 69 and having mounted at its extremities a plurality of rollers 70 free to turn readily about their axes 71 and adapted to engage a tire. Integral with this yoke is a lug 72 which is connected to a lever 73, by a link 74, and adapted to swing the yoke about the fulcrum 69 from one extreme position to another, as indicated by dot and dash lines and full lines in Fig. 3.

Rigidly secured to the lower side of the table 2 is a plurality of cams 75 comprising flat strips of metal assuming crown portions 76 and side portions extending acutely relative to the table 2. The cams are spaced on an arc about the axis of the machine to provide dwell periods between the cams at regular, predetermined intervals during rotation of the table 2 relative to a cam follower 77. The crown portions of the cams 75 are so positioned that the central portion thereof is in a vertical plane centrally of the space between adjacent sub-frames 20, and so disposed as to engage the cam follower 77 rotatably mounted at the end of lever 73. When in normal position, as shown in Figs. 2 and 3, the follower rides on the crown of the cam and the arm 68 of the yoke member prevents tires from the chute 52 passing therebeyond. The follower 77, through spring 78, is in constant engagement with cam surfaces 75 during rotation of the frame 1. As the cam rotates and the follower moves down an inclined surface thereof, rotation of the lever 73 about its fulcrum 79 through link 74 causes clockwise increments of rotation of the arm 68, thereupon the tire rolls to a cradle mechanism hereinafter described.

In order that a tire may be transmitted from the conveyor chute 52 and yoke arms 67 and 68 to points on the machine where trimming actually takes place, I provide a cradle mechanism (Figs. 1 to 5, inclusive) comprising a cradle 80 having reinforced base and side portions 81 and 82, respectively (Fig. 4). The sides thereof extend in an upward and outward direction relative to the base, and have curvilinear surfaces (Fig. 3) to correspond with the exterior of an automobile tire. To provide effective rotation of the cradle 80 about a fulcrum 83, I provide a fluid pressure cylinder 84 adapted to rock the cradle arm 85 by rod 86 pinned to the cradle arm at 87. The cylinder 84 is pinned at a pivot point 88 on the crossmember 64 of the frame for supporting the conveyor chute 52. Fluid under pressure is conveyed to the cylinder 84 through flexible conduits 89 and 90, the flow of which is controlled by a conventional valve 91. Just below the edge of the table 1 and protruding beyond the periphery thereof (Fig. 1) is a plurality of similarly shaped cams 92, a unit of which (Fig. 5) comprises a uniformly high surface 93 terminating at a sloping surface 94 which, in turn, terminates at the periphery of the table to afford a gentle rise for the follower 95, while its rear trailing end terminates abruptly to cause sudden drop of the cam follower. As the table rotates and a pair of spools are brought in line with the conveyor 52, a cam 92 (Fig. 5) engages the follower 95, causing lever 96 to rock about a fulcrum 97 against the force of a tension spring 98, opening the valve 91 and allowing fluid under pressure to rock the cradle 80 from the position of rest to its extreme discharge position, as shown in Fig. 3. The operation of cradle 80 serves to positively transfer the tire to the aligned spools 27 and 28.

In order that the machine may eject a tire after trimming, I provide suitable means for moving the tire out of engagement with the rotative central mechanism, so that it can proceed to some other point in the factory. As rotation of the table causes consecutive engagement of the discharge units 99 (Fig. 6) by a cam 100 carried by the discharge chute, each unit is actuated independently of each other. The discharge cam 100 (Figs. 6 and 7) is mounted on the frame of a discharge chute 101. This frame comprises a series of upright members 102, 103, and 104 together with horizontal rails 105, for carrying the cam 100 at the ends thereof, and these members are rigidly spaced relative to each other by space bars 106. An inclined trough 107 having sides 108 (Fig. 8) and bottom 109 to receive a tire is supported by the space bars 106. A pair of top rails 110 is adapted to engage the sides of a tire and maintain it in substantially vertical position. The structure is further braced by a pair of inclined members 111.

Mounted on a bearing shaft 112 (Fig. 6) connected to the posts 24 and 25 by bearings 113 (Fig. 2) is a lever 114 carrying on either side of its free extremity and on the same axis two sections of sheave 115 which are free to turn on their axes 116 and adapted to engage the tread of a tire. The lever 114 is connected to a bell crank lever 117 by a link 118, the lower end of which normally rests on the table 2. At regular predetermined intervals the sheave 115 is raised and lowered as the bell crank lever swings about its fulcrum 119 due to engagement of a cam follower 120 with the cam 100. The force of gravitation maintains the cam follower 120 in engagement with the surface of the cam 100 as rotation of the table causes the followers of individual discharge mechanisms to engage the cam 100. The further operation of this mechanism is hereafter described.

Electric power for operation of the motors 38 is conveyed from any convenient source of supply through brushes 121 and 122 (Fig. 2), respectively, in engagement with rings 123 and 124 mounted on a conduit 125. The conduit 125 is rigidly secured to the superstructure 42 at the vertical axis of the table 2. The upper extremity thereof is pivoted at a ceiling support 126.

Operation

In the operation of the tire manipulating machine of my invention it may be assumed that at the start of operation movement of a tire down the incline 52 has been arrested and temporarily maintained by the stop arm 68, as shown by the dot and dash lines in Fig. 3. As the table 2 continues to rotate, the crown portion of the cam 75 passes out of engagement with the follower 77, thus enabling tension spring 78 to rock the lever 73 about its fulcrum. This motion releases the tire and accelerates its movement toward the cradle 80.

Each of the cams 92 is so positioned on the table relative to the cradle cams 75 that as the follower 77 rides out of engagement with its mating cam the cradle follower engages with the cradle cam 92. As rotation of the table 2 is continued, the valve 91 is actuated and the piston rod 86 is moved outwardly, thus rocking the cradle in clockwise direction about its fulcrum 83, as shown in Fig. 5, causing a tire therein to move into position on the trimming sheaves 27 and 28. In this movement sufficient force is applied to the tire to overcome the weight of the guide mechanism 45 when assisted by rotation of spool 27. The cradle mechanism, having now come to rest, is ready for another cycle of operation.

In Fig. 9 is shown a tire 127 having formations 128 and 129 protruding from the tread of a tire after vulcanization in a conventional mold. The formations 128 usually take the form of a ribbon of rubber resulting from imperfect closure of the mold sections, and the projections 129 result from air vents in the mold.

In order that the projecting formations may be removed by the aid of the present invention, workmen are stationed around the outside of the machine, either on the stationary platform 18 where tires to be trimmed are moved past them, or on the edge of the table 2 as is operator 124. Here he may complete the desired operation on a tire while being carried around by rotation of the table about its axis. He may then step back on the platform 18 to return to his starting point, without interfering with other operators on the platform. As tires are placed in contact with the driven spools and guide sheaves, they rotate about their own axes throughout their movement around the circular path. During this stage, workmen manually apply a cutting tool to the periphery of the tires and remove the irregularities.

As each consecutive tire is moved to a point in front of the discharge chute (Fig. 6), the cam 100 engages the follower 120, which indirectly raises the sheave 115 and the tire immediately above it. When the tire is moved to a point substantially to the left of a vertical plane of the axis of the spool 27 it is free to move by force of its own weight toward the discharge chute 101. Thereafter, the unit is in readiness for receiving another tire in a similar cycle of operation.

While I have shown a preferred embodiment of the invention and method of practicing it, it will be obvious that it is susceptible of modifications and it is intended to include those modifications which are within the spirit of the invention and the scope of the appended claims.

Having thus described my invention, what I claim and desire to protect by Letters Patent is:

1. A tire manipulating mechanism comprising a horizontally disposed circular platform, means for moving the platform about its vertical central axis, a plurality of tire supports carried by the platform and adapted to engage the periphery of a vertically positioned tire, and means for rotating the supports to thereby rotate the tire about a horizontal axis.

2. A tire manipulating mechanism comprising a horizontally disposed circular platform, means for rotating the platform about its vertical central axis, a plurality of tire supports carried by the platform and adapted to engage the periphery of a tire for rotating it, means for rotating the supports to thereby rotate the tire, and guiding means for rotatably maintaining the tire in a horizontal axis while in cooperative relation with the supports.

3. A tire manipulating mechanism comprising a horizontally disposed circular platform, means for moving the platform horizontally about its center, a plurality of tire supports carried by the platform and adapted to engage the periphery of a vertically positioned tire, means for rotating the supports and said tire, a conveyor, and means operable by the horizontal movement of the platform for transferring tires from the conveyor to the tire supports.

4. A tire manipulating mechanism comprising a rotatable circular platform, means for rotating the platform, a plurality of pivotally mounted tire supports carried by the platform and adapted to engage the periphery of a tire, means for rotating the supports, the axes of said supports being disposed substantially at right angles relative to the axis of the platform, a conveyor, a cradle, means operable by the platform for transferring tires from the conveyor to the cradle, and additional means operable by the platform for transferring tires from the cradle to the tire supports.

5. A tire manipulating mechanism comprising a circular platform, means for moving the platform horizontally, a tire support carried by the platform and adapted to engage the periphery of a vertically disposed tire, means for rotating the support to thereby rotate a tire, a discharge conveyor, and means comprising rotatable means cooperating between the discharge conveyor and the platform for transferring a rotating tire from the support to the discharge conveyor.

6. A tire manipulating mechanism comprising a circular platform, means for rotating the platform, a plurality of tire supports radially positioned upon and carried by the platform and each adapted to engage the periphery of a vertically disposed tire, means for rotating the supports, a conveyor, means operable by the platform for transferring tires from the conveyor to the tire supports, a discharge conveyor, and means cooperable between the discharge conveyor and the platform for transferring tires from the supports to the discharge conveyor.

7. A tire manipulating mechanism comprising a circular platform, means for moving the platform, a plurality of tire supports carried by the platform and each adapted to engage the periphery of a tire, means for rotating the supports, a conveyor, a cradle, means operable by the platform for transferring tires from the conveyor to the cradle, additional means operable by the platform for transferring tires from the cradle to the tire supports, a discharge conveyor, and means cooperable between the discharge conveyor and the platform for transferring tires from the supports to the discharge conveyor.

8. A tire manipulating mechanism comprising a circular platform, means for moving the platform, a plurality of rotatable grooved tire supports carried by the platform and each adapted to engage the periphery of a tire and center the tire for substantially true vertical rotational movement, means for rotating the supports, a conveyor, a plurality of cams in spaced relation around the platform, and means cooperable with the cams for transferring tires from the conveyor to the supports.

9. A tire manipulating mechanism comprising a circular platform, means for rotating the platform in a horizontal plane, a plurality of tire supports carried by the platform and each adapted to engage the periphery of a vertically disposed tire, means for rotating the supports, a conveyor, a cradle, a plurality of cams in spaced relation around the platform, means cooperable with the cams for transferring vertically disposed tires from the conveyor to the cradle, and additional means operable by the platform for transferring said tires from the cradle to the horizontally moving tire supports.

10. A tire manipulating mechanism comprising a circular platform, means for moving the platform about its central perpendicular axis, a plurality of tire supports carried by the platform and each adapted to engage the periphery of a tire, means for rotating the supports upon axes substantially at right angles relative to the axis of said platform, a conveyor, a plurality of cams in spaced relation around the platform, means cooperable with the cams for transferring tires from the conveyor to the supports, a discharge conveyor, and means cooperable between the discharge conveyor and the platform for transferring tires from the supports to the discharge conveyor.

11. A tire manipulating mechanism comprising a horizontally rotatable circular platform, means for rotating the platform, a plurality of tire supports carried by the platform and each adapted to engage the periphery of a vertically disposed tire, means for rotating the supports to thereby rotate said tire, a conveyor, a cradle, a plurality of cams in spaced relation around the platform, means cooperable with the cams for transferring tires from the conveyor to the cradle, additional means operable by the platform for transferring tires from the cradle to vertical positions upon the tire supports, a discharge conveyor, and means cooperable between the discharge conveyor and the platform for transferring tires from the supports to the discharge conveyor.

NORTON G. RAYMOND.